United States Patent
Adachi et al.

(10) Patent No.: US 9,244,803 B2
(45) Date of Patent: Jan. 26, 2016

(54) FAILURE PREDICTIVE SYSTEM, AND FAILURE PREDICTIVE APPARATUS

(71) Applicant: FUJI XEROX CO., LTD., Tokyo (JP)

(72) Inventors: Koji Adachi, Kanagawa (JP); Norikazu Yamada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/474,731

(22) Filed: Sep. 2, 2014

(65) Prior Publication Data

US 2015/0227447 A1 Aug. 13, 2015

(30) Foreign Application Priority Data

Feb. 10, 2014 (JP) ................................. 2014-023202

(51) Int. Cl.
| | |
|---|---|
| *G06F 3/12* | (2006.01) |
| *G06F 11/34* | (2006.01) |
| *G06F 11/00* | (2006.01) |
| *G06F 11/32* | (2006.01) |
| *H04N 1/00* | (2006.01) |

(52) U.S. Cl.
CPC .......... *G06F 11/3409* (2013.01); *G06F 11/008* (2013.01); *G06F 11/321* (2013.01); *H04N 1/00042* (2013.01); *H04N 1/00074* (2013.01); *H04N 2201/0094* (2013.01)

(58) Field of Classification Search
CPC . G03G 15/5079; G03G 15/55; G03G 15/553; G03G 2215/00109; G03G 2215/00548; H04N 1/00344; H04N 2201/0082; H04N 2201/0093; H04N 1/00222; H04N 1/32106; H04N 2201/0039; H04N 2201/0094

USPC ............... 358/1.15, 1.14, 402, 1.13; 709/224, 709/223, 225, 217, 219, 226, 207, 218, 220, 709/222, 229

See application file for complete search history.

(56) References Cited

U.S. PATENT DOCUMENTS

| | | | | |
|---|---|---|---|---|
| 6,185,555 | B1 * | 2/2001 | Sprenger et al. ....................... | 1/1 |
| 6,985,901 | B1 * | 1/2006 | Sachse et al. ........................... | 1/1 |
| 7,636,306 | B2 * | 12/2009 | Dougall et al. ............... | 370/230 |
| 8,266,477 | B2 * | 9/2012 | Mankovskii et al. ........... | 714/15 |
| 8,819,266 | B2 * | 8/2014 | Salonikios ..................... | 709/232 |
| 8,826,281 | B2 * | 9/2014 | Wing et al. .................... | 718/100 |
| 2012/0065885 | A1 * | 3/2012 | Imazeki et al. ................... | 702/1 |
| 2012/0317286 | A1 * | 12/2012 | Kawana et al. ............... | 709/225 |
| 2013/0272723 | A1 * | 10/2013 | Imazeki et al. .................... | 399/8 |
| 2015/0049161 | A1 * | 2/2015 | Fukushima ................ | 348/14.04 |
| 2015/0049363 | A1 * | 2/2015 | Nishiyama ................... | 358/1.15 |

FOREIGN PATENT DOCUMENTS

| | | |
|---|---|---|
| JP | A-62-264854 | 11/1987 |
| JP | A-8-249046 | 9/1996 |
| JP | A-2001-92520 | 4/2001 |

* cited by examiner

*Primary Examiner* — Negussie Worku
(74) *Attorney, Agent, or Firm* — Oliff PLC (57) ABSTRACT

Provided is a failure predictive system, including a collection unit that collects information with respect to a job implemented in a monitored apparatus and information with respect to a job to be implemented, a calculating unit that calculates a probability of a failure occurrence in the monitored apparatus based on information with respect to the implemented job and information with respect to the job to be implemented which are collected by the collection unit, and an output unit that outputs information based on the probability when the probability calculated by the calculating unit is over a threshold value.

16 Claims, 7 Drawing Sheets

| PREDICTIVE MODEL NAME | PARAMETER NAME |
|---|---|
| TONER BLEMISH MODEL | TONER DENSITY |
| | DEVELOPMENT ELECTRIC POTENTIAL |
| | PRIMARY IMAGE TRANSFER VOLTAGE |
| | HUMIDITY |
| | TOTAL COVERAGE FOR EACH PREDETERMINED OUTPUT |
| | . . . |

FAILURE PREDICTIVE SYSTEM, AND FAILURE PREDICTIVE APPARATUS

CROSS-REFERENCE TO RELATED APPLICATIONS

This application is based on and claims priority under 35 USC 119 from Japanese Patent Application No. 2014-023202 filed Feb. 10, 2014.

BACKGROUND (i) Technical Field

The present invention relates to a failure predictive system, and a failure predictive apparatus.

(ii) Related Art

As an image forming apparatus having a function of forming an image on a recording material such as sheet, a copying machine, a printer apparatus, a facsimile apparatus, a multi-functional machine combined with the functions thereof, and the like are known.

The image forming apparatus produced commercially may often be used in a marginal condition such as a continuous operation for mass printing or a usage of wide variety of sheets, and a full-time operator performs maintenance with respect to an apparatus state and maintains the operation. In particular, in an electrophotography-type image forming apparatus, due to a complicated image forming mechanism, it is difficult to maintain a stable operation only by the maintenance of the full-time operator, and thus the stable operation is maintained by a scheduled visit of a maintenance service engineer of a manufacturer. However, the scheduled visit of the maintenance service engineer is not sufficient, and thus an unscheduled visit for handling a trouble that has occurred may occur.

Recently, in order to handle such a situation as described above, a so-called remote maintenance service in which the state of the image forming apparatus is remotely monitored, and a preventative maintenance visit is performed when a predictor of the trouble is observed is spread, and it is helpful to reduce down time (a time period for a state in which an original function of the apparatus is hindered from being used due to a failure) of the image forming apparatus.

Up to now, various technologies with respect to a failure prediction targeted at various apparatuses or facilities have been proposed.

SUMMARY

According to an aspect of the invention, there is provided a failure predictive system, including:

a collection unit that collects information with respect to a job implemented in a monitored apparatus and information with respect to a job to be implemented;

a calculating unit that calculates a probability of a failure occurrence in the monitored apparatus based on information with respect to the implemented job and information with respect to the job to be implemented which are collected by the collection unit; and an output unit that outputs information based on the probability when the probability calculated by the calculating unit is over a threshold value.

BRIEF DESCRIPTION OF THE DRAWINGS

Exemplary embodiments of the present invention will be described in detail based on the following figures, wherein.

DETAILED DESCRIPTION

An exemplary embodiment of the invention will be described with reference to the drawings.

Figure 1:
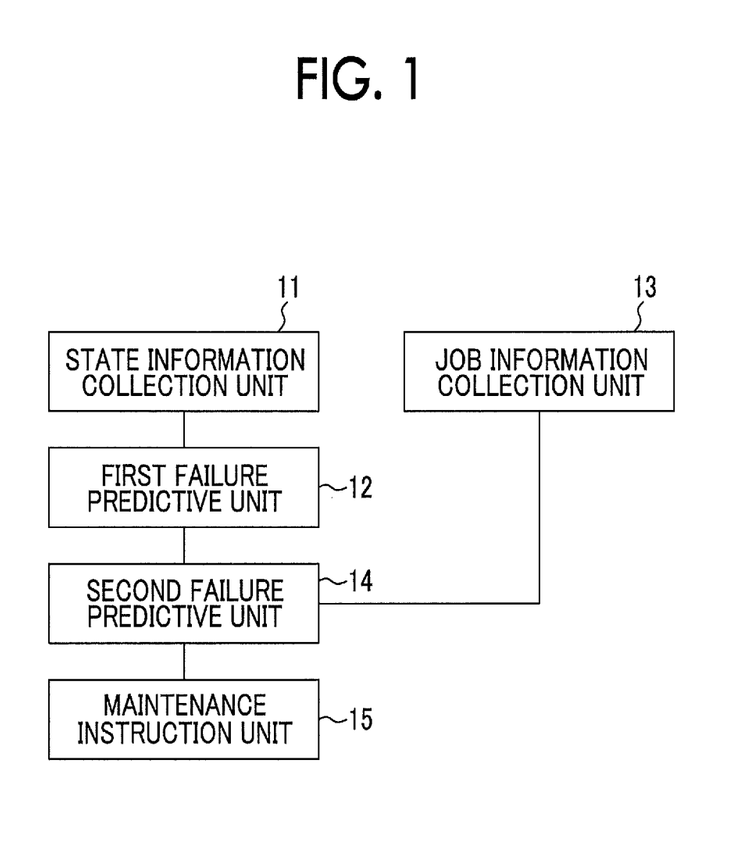
FIG. 1 is a diagram illustrating a configuration example of a failure predictive system according to an exemplary embodiment of the invention.

In FIG. 1, a configuration example of a failure predictive system according to an exemplary embodiment of the invention is illustrated.

The failure predictive system in FIG. 1 performs a failure prediction based on job information of the future with respect to an image forming apparatus which forms an image on a recording material such as sheet and outputs the recording material having the image thereon, in addition to a failure prediction based on past data, and notifies a user of the image forming apparatus of a result thereof. In addition, the failure predictive system includes a state information collection unit 11, a first failure predictive unit 12, a job information collection unit 13, a second failure predictive unit 14, and a maintenance instruction unit 15.

Furthermore, in this example, the respective functional units 11 to 15 are separately disposed in the image forming apparatus, but the respective functional units 11 to 15 may be disposed in other apparatuses such as a job management unit or a remote support center server which is connected to one or more image forming apparatuses to be able to communicate with each other.

Here, the job management unit is an apparatus for managing a job which is implemented in a subject image forming apparatus, and, for example, a printing process server or the like for processing a scheduling or a rendering of a printing job of a printer which is an example of the image forming apparatus is included.

In addition, the job is a data unit for handling an image forming process in the job management unit or the image forming apparatus, and a scheduling in the job management unit, an implementation instruction to the image forming apparatus from the job management unit, or implementation of the image forming process in the image forming apparatus is performed for each job.

In addition, the job information is data indicating contents of the job, and, for example, in the job information of the printing job, data such as the number of printed sheets, a total coverage (a printing area ratio), and sheet characteristics is included, in addition to printing data to be printed (data such as a character, a diagram, and an image).

The state information collection unit 11 collects various state information items indicating a state of the image forming apparatus at the time of implementing the image forming process based on the job information applied from various job management unites, and accumulates the information.

The state information is used when the failure prediction (in this example, a calculation of a current value of a failure predictor probability) of the first failure predictive unit (described later) is performed. That is, information affecting a result of the failure prediction is collected as the state information. As the state information, for example, control information of the image forming process, environmental information such as temperature or humidity, job information, used history information of a replacement component, printing sheet information, or the like is included.

A collection timing of the state information is defined in advance, and, for example, collection and accumulation of the state information are performed at a timing such as a timing after finishing a job, a timing of every elapsing of a predetermined time, and a timing of arrival of a predetermined time.

A period for accumulating the collected information is at least a data period which is used in the failure prediction of the first failure predictive unit 12 (described later), but the information may be accumulated in a period more than or equal to the data period.

The first failure predictive unit 12 applies the state information collected by the state information collection unit 11 to a predetermined predictive model, and calculates the current value of the failure predictor probability.

Here, the current value of the failure predictor probability is numerical data indicating a possibility of failure occurrence at the current time, which is presumed from a performance of the image forming apparatus so far.

In this example, the current value of the failure predictor probability is calculated by using the most recent state information of the predetermined data period.

A diagnosis timing for calculating the current value of the failure predictor probability is defined in advance, and, for example, the current value of the failure predictor probability is calculated at a timing such as a timing after finishing a job, a timing of every elapsing of a predetermined time, and a timing of arrival of a predetermined time.

The predictive model of this example is configured to be able to calculate the failure predictor probability for each type of failure such as density unevenness, fogging, and a white stripe. As the predictive model of an image quality failure, for example, a predictive model disclosed in JP-A-2013-109483 is able to be applied, but other predictive models such as a predictive model using a Mahalanobis distance or a predictive model using a boosting algorithm may be applied. Furthermore, the predictive model disclosed in JP-A-2013-109483 is a model which is constructed by performing machine learning with respect to data at the normal time and data for several days right before the failure, but the numerical data calculated as the failure predictor probability is a relative index indicating a predictor of the failure.

In addition, the first failure predictive unit 12 compares the calculated current value of the failure predictor probability with a predetermined threshold value (for example, 80%), determines whether or not there is the predictor of the failure when the current value of the failure predictor probability is over the threshold value, and notifies the maintenance instruction unit 15 of that effect.

Furthermore, the threshold value used in determining presence or absence of the predictor of the failure is different depending on a type of target failure, a predictive model applied to the type of failure, or the like.

The job information collection unit 13 collects the job information which is implemented in the image forming apparatus from the job management unit, and accumulates the information. The collected job information includes not only the information output from the job management unit to the image forming apparatus with arrival of a predetermined implementation timing as a momentum, but also information in a scheduled state which is scheduled to be implemented in the future. Accordingly, past job information which has already been implemented and future job information which is scheduled to be implemented in the future are accumulated in the job information collection unit 13.

The collection of the job information is realized by inquiring the presence or absence of the job information to the job management unit, and by requesting transmission of the information including the information in the scheduled state.

In this example, the collection of the job information is performed after the failure prediction (the calculation of the current value of the failure predictor probability) by the first failure predictive unit 12, but, for example, the collection of the job information may be performed at other timings such as a timing of every elapsing of a predetermined time, and a timing of arrival of a predetermined time.

Furthermore, as described above, the first failure predictive unit 12 of this example calculates the current value of the failure predictor probability by using the job information collected in the state information collection unit 11, but the job information collected in the job information collection unit 13 may be used.

The second failure predictive unit 14 calculates a future value of the failure predictor probability by applying the job information (the past job information and the future job information) collected in the job information collection unit 13 to the predetermined predictive model.

In addition, similar to the first failure predictive unit 12, the second failure predictive unit 14 compares the calculated future value of the failure predictor probability with a predetermined threshold value (for example, 80%), determines whether or not there is the predictor of the failure when the future value of the failure predictor probability is over the threshold value, and notifies the maintenance instruction unit 15 of that effect.

Here, the future value of the failure predictor probability is numerical data indicating a possibility of failure occurrence at a future time (a time point on which the job is conducted based on the future job information), which is presumed from the performance of the image forming apparatus so far and a future operation plan of the image forming apparatus. That is, the future value of the failure predictor probability is a value in which the current value of the failure predictor probability is corrected according to the future operation plan of the image forming apparatus.

In this example, for example, in the predictive model using parameters (characteristic values) with respect to the job characteristics such as the number of printed sheets, the total coverage, and the sheet characteristics, when the future job characteristics are considerably varied compared to a trend (a trend of time-series variation) of the most recent job characteristics of the predetermined data period, the parameter of the job characteristics in the predictive model is applied to the parameter of the future job characteristics by replacement, and thus the future value of the failure predictor probability is calculated.

In addition, in this example, as new future job information is collected by the job information collection unit 13, the future value of the failure predictor probability is calculated.

Figure 2:
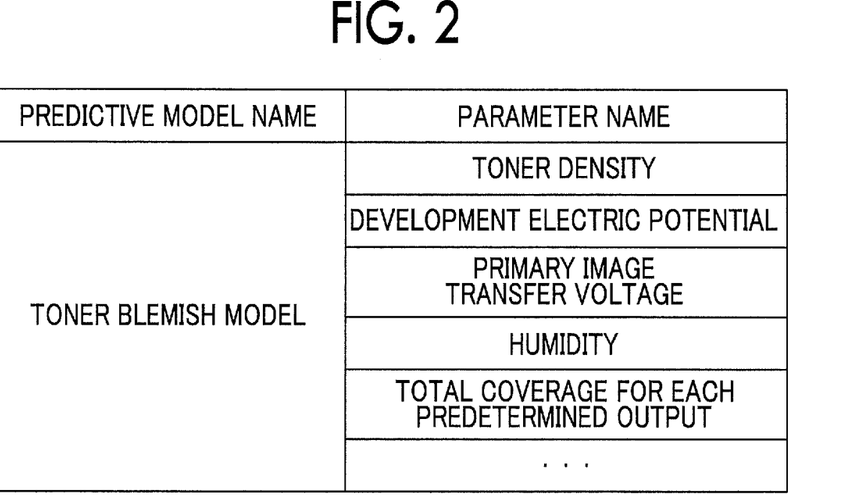
FIG. 2 is a diagram illustrating an example in which parameters of job characteristics are included in parameters used in a predictive model.

In FIG. 2, an example in which the parameters of the job characteristics are included in parameters used in the predictive model is illustrated.

In the example of FIG. 2, toner density, a development electric potential, a primary image transfer voltage, humidity, and a total coverage for each predetermined output are set as the parameters used in the predictive model with respect to the failure of "toner spits". Among these parameters, the total coverage for each predetermined output is a parameter of the job characteristics. For this reason, when a future total coverage grasped from the future job information has no connection to the trend so far, the total coverage for each predetermined output affects the failure predictor probability of future "toner spits".

Figure 3A:
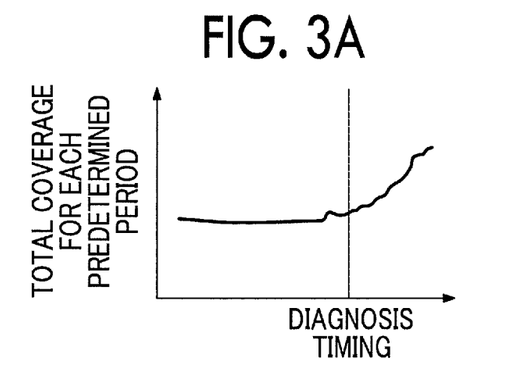
FIG. 3A is a diagram illustrating an example of a time-series variation of a total coverage for each predetermined output.
Figure 3B:
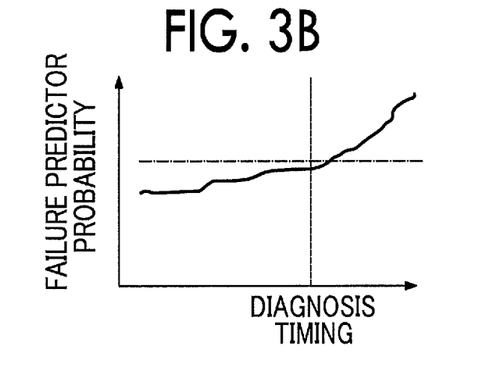
FIG. 3B is a diagram illustrating an example of a time-series variation of a failure predictor probability of "toner spits"

In FIG. 3A, an example of a time-series variation of the total coverage for each predetermined output is illustrated, and in FIG. 3B, an example of a time-series variation of the failure predictor probability of the "toner spits" according to the time-series variation of the total coverage for each predetermined output is illustrated. Furthermore, in FIG. 3B, the failure predictor probability before the diagnosis timing illustrates the current value of the failure predictor probability in a time series sequence, and the failure predictor probability after the diagnosis timing illustrates the future value of the failure predictor probability in the time series sequence, which is calculated by applying each future job information item to the predictive model by the replacement in a sequence according to an implementation plan thereof.

In the examples of FIGS. 3A and 3B, it is understood that a fluctuation of the total coverage for each predetermined output is small and the failure predictor probability is gradually increased before the diagnosis timing (a time point of calculating the current value of the most recent failure predictor probability), but the total coverage for each predetermined output is rapidly increased and in consequence the failure predictor probability is rapidly increased after the diagnosis timing.

That is, according to a transition of the current value of the failure predictor probability, there is a holding period to some extent before the failure predictor probability exceeds the threshold value, but according to a transition of the future value of the failure predictor probability in which the future operation plan of the image forming apparatus is considered, the holding period before the failure predictor probability exceeds the threshold value is shortened.

The maintenance instruction unit 15 displays maintenance information on a display unit such as an operation panel of the image forming apparatus based on a notification from the first failure predictive unit 12 or the second failure predictive unit 14. In this example, as the maintenance information, a message for instructing maintenance, the current value or the future value of the failure predictor probability, and processing information indicating processing contents valid for preventing or eliminating the failure are displayed.

Accordingly, the user (an operator) of the image forming apparatus is able to grasp that it is necessary to immediately conduct the maintenance in order to prevent or eliminate the failure, and thus necessary processes are conducted. Accordingly, it is possible to effectively reduce down time due to the failure.

Furthermore, the maintenance information may be output according to other aspects such as an aspect of a printing output, or an aspect of a sound output in addition to an aspect of a display output as in this example, and it is preferable that the user be able to recognize the maintenance information.

Figure 4:
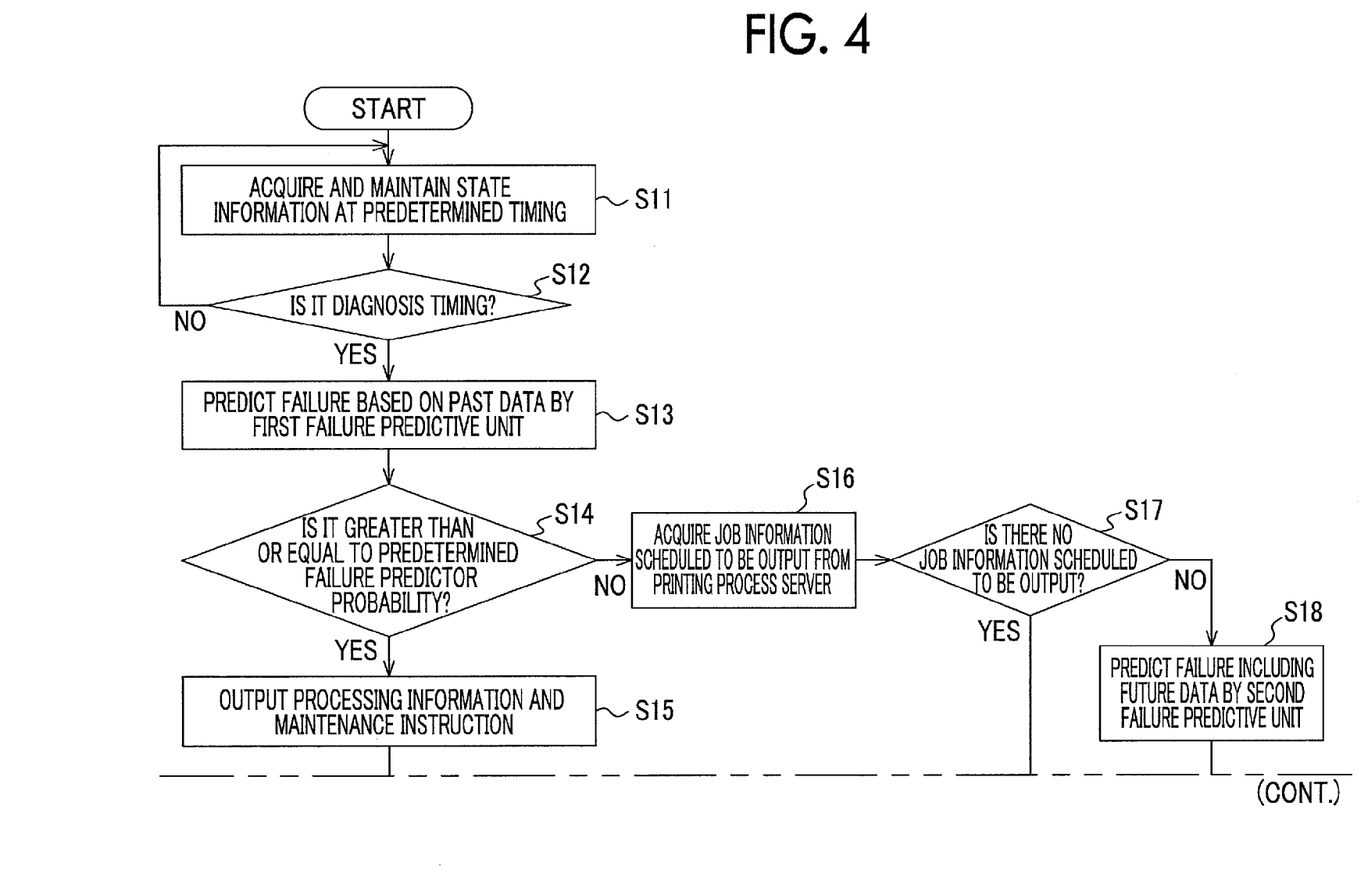
FIG. 4 is a diagram illustrating an example of a processing flow in the failure predictive system of FIG. 1.

In FIG. 4, an example of a processing flow in the failure predictive system of FIG. 1 is illustrated.

In the image forming apparatus of the failure predictive system of this example, the state information collection unit collects and maintains the state information at each collection timing of the state information (Step S11).

In addition, it is periodically determined whether or not the diagnosis timing has arrived (Step S12), and when it is determined that the diagnosis timing has not arrived (the determination result; No), the process returns to Step S11, and the processes of collecting and maintaining the state information are repeated.

On the other hand, in Step S12, when it is determined that the diagnosis timing has arrived (the determination result; Yes), the failure prediction is performed based on the past data by the first failure predictive unit 12 (Step S13).

Then, it is determined whether or not the current value of the failure predictor probability calculated in the failure prediction by the first failure predictive unit 12 is higher than or equal to the threshold value (Step S14), and when it is determined that the current value of the failure predictor probability is higher than or equal to the threshold value (the determination result; Yes), the maintenance instruction unit outputs the maintenance information including the maintenance instruction and the processing information (Step S15).

On the other hand, in Step S14, when it is determined that the current value of the failure predictor probability is not higher than or equal to the threshold value (the determination result; No), the job information collection unit 13 acquires the job information which is scheduled to be output from the job management unit in the future (Step S16).

Subsequently, it is determined whether there is no job information which is scheduled to be output in the future (Step S17), and when it is determined that there is the job information which is scheduled to be output in the future (the determination result; No), the failure prediction including the future data by the second failure predictive unit 14 is performed (Step S18).

Then, it is determined whether or not the future value of the failure predictor probability calculated in the failure prediction by the second failure predictive unit 14 is higher than or equal to the threshold value (Step S19), and when it is determined that the future value of the failure predictor probability is higher than or equal to the threshold value (the determination result; Yes), the maintenance instruction unit outputs the maintenance information including the maintenance instruction and the processing information (Step S20).

Furthermore, after the maintenance information is output in Step S15 or Step S20, or when it is determined that there is no job information which is scheduled to be output in the future in Step S17 (the determination result; Yes), the process returns to Step S11, and the processes of collecting and maintaining the state information are repeated.

As described above, in the image forming apparatus of the this example (the failure predictive system of FIG. 1), the state information collection unit 11 collects the state information of the image forming apparatus, and the first failure predictive unit 12 calculates the current value of a failure occurrence probability (a probability of the failure occurrence) based on the state information collected in the state information collection unit 11, in addition, the job information collection unit 13 collects the job information implemented in the image forming apparatus and the job information to be implemented, and the second failure predictive unit 14 calculates the future value of the failure occurrence probability based on the implemented job information and the job information to be implemented which are collected in the job information collection unit 13. Then, when a calculation result (the current value or the future value of the failure occurrence probability) by the first failure predictive unit 12 or the second failure predictive unit 14 is over the threshold value, the maintenance instruction unit 15 outputs the maintenance information to be recognizable by the user.

Accordingly, a necessity for the maintenance is determined from the current value of the failure occurrence probability based on the performance of the image forming apparatus so far, and it is possible to notify the user of the image forming apparatus of a result thereof, in addition, a necessity for the maintenance is determined from the future value of the failure occurrence probability based on the future operation plan of the image forming apparatus, and it is possible to notify the user of the image forming apparatus of a result thereof.

That is, in this example, although there is no necessity for the maintenance from the performance of the image forming apparatus so far, it is detected that there is the necessity for the maintenance according to the future operation plan of the image forming apparatus, and it is possible to notify the user of the image forming apparatus of the result thereof, and thus it is possible to reduce down time of the image forming apparatus by conducting suitable maintenance.

Furthermore, in this example, each image forming apparatus calculates the failure occurrence probability with respect to the own device, and outputs the result thereof, and thus the user of the image forming apparatus recognizes the necessity for the maintenance, but the job management unit or other management apparatuses may collect various information items necessary for calculating the failure occurrence probability for each image forming apparatus which is a failure prediction target, and may calculate the failure occurrence probability, and thus may output the result thereof. Accordingly, other people (for example, a maintenance staff of the image forming apparatus) are able to recognize the necessity for the maintenance.

In addition, the predictive model used in calculating the failure occurrence probability may be prepared for each type of failure, and the first failure predictive unit 12 or the second failure predictive unit 14 may calculate the failure occurrence probability by using the predictive model corresponding to the type of failure for each type of failure.

Accordingly, the type of failure which is possibly occur in the near future is specified, and then whether or not there is the necessity for the maintenance is able to be determined, and thus it is possible to more accurately conduct the maintenance.

Figure 5:
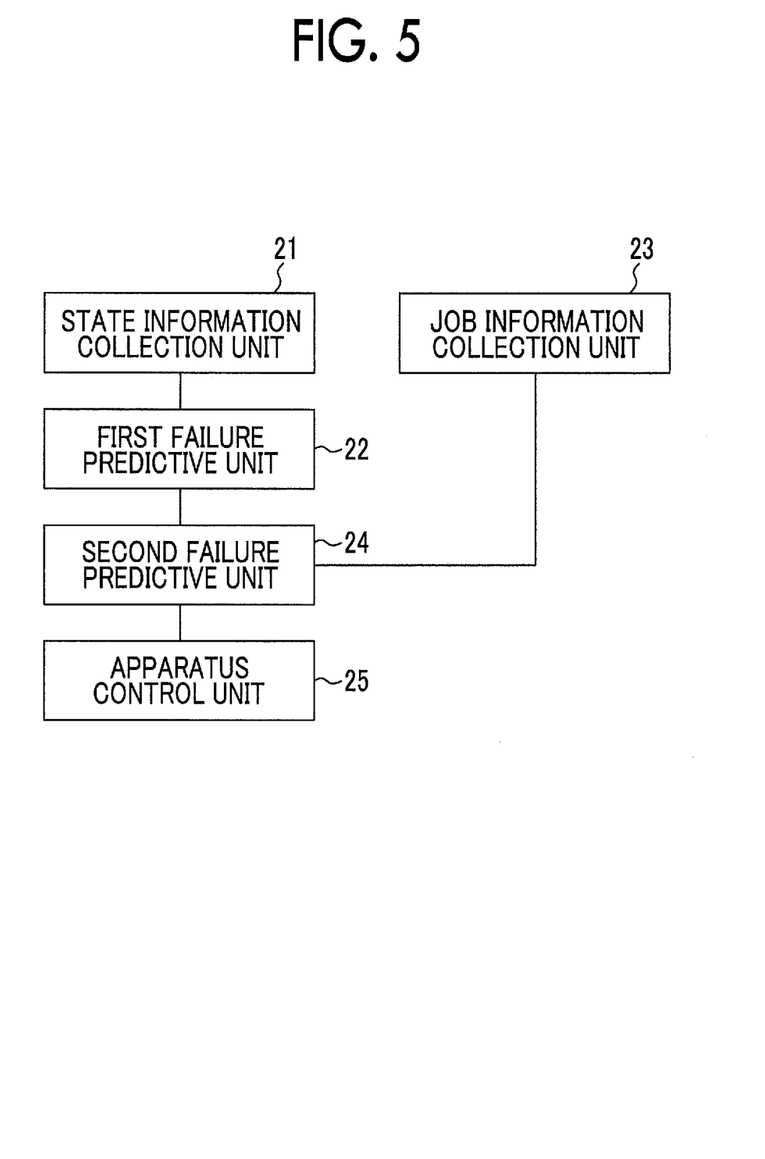
FIG. 5 is a diagram illustrating another configuration example of a failure predictive system according to another exemplary embodiment of the invention.

In FIG. 5, another configuration example of a failure predictive system according to another exemplary embodiment of the invention is illustrated.

The failure predictive system of FIG. 5 performs a failure prediction based on job information of the future with respect to an image forming apparatus which forms an image on a recording material such as sheet and outputs the recording material having the image thereon, in addition to a failure prediction based on past data, and controls the own device or an external device based on a result thereof. In addition, the failure predictive system includes a state information collection unit 21, a first failure predictive unit 22, a job information collection unit 23, a second failure predictive unit 24, and an apparatus control unit 25.

Furthermore, the functional units 21 to 24 are identical to the functional units 11 to 14 with the same name in FIG. 1. That is, in the failure predictive system of FIG. 5, the apparatus control unit 25 is disposed instead of the maintenance instruction unit 15 (or, together with the maintenance instruction unit 15) of FIG. 1, and thus the description of the functional units 21 to 24 will be omitted.

The apparatus control unit 25 outputs control information (information for changing a setting of the apparatus) to the apparatus which affects an implementation situation of a job in the image forming apparatus based on a notification (a notification to the effect that a current value or a future value of a failure occurrence probability is over a threshold value) from the first failure predictive unit 12 or the second failure predictive unit 14.

As an output destination (the apparatus which affects the implementation situation of the job in the image forming apparatus) of the control information, the image forming apparatus itself, a job management unit for managing the job which is implemented in the image forming apparatus, an air conditioner for adjusting temperature or humidity of an installation environment (a room in which the image forming apparatus is installed) of the image forming apparatus, and the like are included.

As an example, when mass printing is scheduled to be conducted for a job in the future, and an occurrence of an image quality failure (for example, a white stripe caused by toner sticking) due to an increase in the temperature inside the image forming apparatus is predicted, the apparatus control unit 25 outputs the control information to the effect that an interval for implementing the job is widened to a job implementation control unit of the own device, or outputs the control information to the effect that the temperature is below a target temperature to the air conditioner of the installation environment of the image forming apparatus, and thus the temperature inside the apparatus is prevented from being increased, and an occurrence of an image quality trouble is prevented beforehand, or a holding period before the occurrence of the image quality trouble is extended.

In addition, as other examples, when switching to a specified printing sheet in the job of the future is scheduled to occur, and an occurrence of a failure in a sheet transfer system according to the switching is predicted, the apparatus control unit 25 outputs the control information to the effect that the schedule is changed such that the implementation of the job (the job using the specified printing sheet) is excluded to the job management unit, and thus the implementation of the job is suppressed, and the occurrence of the failure in the sheet transfer system is prevented beforehand. Alternatively, the control information to the effect that the schedule is changed such that the implementation of the job is performed in the later sequence is output, and thus the implementation of the job is delayed, and a holding period before the occurrence of the failure in the sheet transfer system extends.

Figure 6:
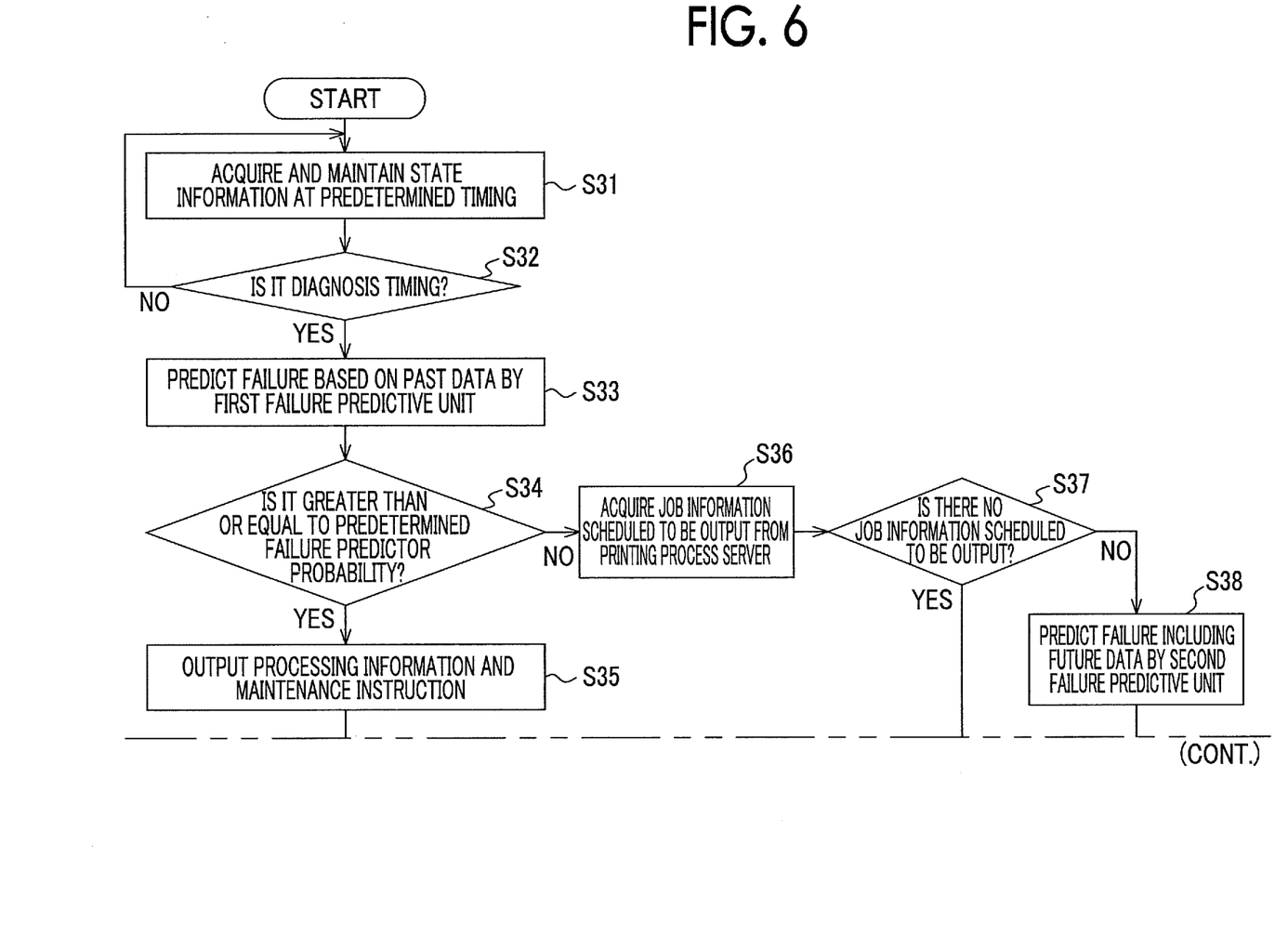
FIG. 6 is a diagram illustrating an example of a processing flow in the failure predictive system of FIG. 5.

In FIG. 6, an example of a processing flow in the failure predictive system of FIG. 5 is illustrated. In the image forming apparatus of the failure predictive system of this example, the state information collection unit 21 collects and maintains the state information at each collection timing of the state information (Step S31).

In addition, it is periodically determined whether or not the diagnosis timing has arrived (Step S32), and when it is determined that the diagnosis timing has not arrived (the determination result; No), the process returns to Step S31, and the processes of collecting and maintaining the state information are repeated.

On the other hand, in Step S32, when it is determined that the diagnosis timing has arrived (the determination result; Yes), a failure prediction is performed based on the past data by the first failure predictive unit 22 (Step S33).

Then, it is determined whether or not the current value of a failure predictor probability calculated in the failure prediction by the first failure predictive unit 22 is higher than or equal to a threshold value (Step S34), and when it is determined that the current value of the failure predictor probability is higher than or equal to the threshold value (the determination result; Yes), maintenance information including a maintenance instruction and processing information is output (Step S35).

On the other hand, in Step S34, when it is determined that the current value of the failure predictor probability is not higher than or equal to the threshold value (the determination result; No), the job information collection unit 23 acquires the job information which is scheduled to be output from the job management unit in the future (Step S36).

Subsequently, it is determined whether there is no job information which is scheduled to be output in the future (Step S37), and when it is determined that there is the job information which is scheduled to be output in the future (the determination result; No), the failure prediction including future data by the second failure predictive unit 24 is performed (Step S38).

Then, it is determined whether or not the future value of the failure predictor probability calculated in the failure prediction by the second failure predictive unit 24 is higher than or equal to the threshold value (Step S39), and when it is determined that the future value of the failure predictor probability is higher than or equal to the threshold value (the determination result; Yes), the apparatus control unit 25 outputs the control information to the image forming apparatus itself or the external device (Step S40).

Furthermore, after the maintenance information is output in Step S35, after the control information is output in Step S40, or when it is determined that there is no job information which is scheduled to be output in the future in Step S37 (the determination result; Yes), the process returns to Step S31, and the processes of collecting and maintaining the state information are repeated.

As described above, in the image forming apparatus of this example (the failure predictive system of FIG. 5), the state information collection unit 21 collects the state information of the image forming apparatus, and the first failure predictive unit 22 calculates the current value of the failure occurrence probability based on the state information collected in the state information collection unit 21, in addition, the job information collection unit 23 collects the job information implemented in the image forming apparatus and the job information to be implemented, and the second failure predictive unit 24 calculates the future value of the failure occurrence probability based on the implemented job information and the job information to be implemented which are collected in the job information collection unit 23. Then, when a calculation result (the future value of the failure occurrence probability) by the second failure predictive unit 24 is over the threshold value, the apparatus control unit 25 outputs the control information to the apparatus (the image forming apparatus itself or the external device) which affects the implementation situation of the job in the image forming apparatus.

Accordingly, a necessity for the maintenance is determined from the current value of the failure occurrence probability based on the performance of the image forming apparatus so far, and it is possible to notify the user of the image forming apparatus of a result thereof, in addition, a necessity for the maintenance is determined from the future value of the failure occurrence probability based on the future operation plan of the image forming apparatus, and based on the result thereof, it is possible to control the operation of the apparatus which affects the implementation situation of the job in the image forming apparatus.

That is, in this example, although there is no necessity for the maintenance from the performance of the image forming apparatus so far, it is detected that there is the necessity for the maintenance according to the future operation plan of the image forming apparatus, and it is possible to reflect the result thereof to the operation of various apparatuses, and thus it is possible to suppress the occurrence of the failure without depending on the maintenance by the user or a maintenance staff of the image forming apparatus, and it is possible to reduce down time of the image forming apparatus.

Furthermore, in this example, each image forming apparatus calculates the failure occurrence probability with respect to the own device, and outputs the result thereof, and thus the operation of the image forming apparatus or the external device is controlled, but the job management unit or other management apparatuses may collect various information items necessary for calculating the failure occurrence probability for each image forming apparatus which is a failure prediction target, and may calculate the failure occurrence probability, and thus may output the result thereof. Accordingly, for example, it is possible to control plural apparatuses such that a job scheduled to be implemented in a certain image forming apparatus is reallocated to be implemented in the other image forming apparatus.

In addition, the predictive model used in calculating the failure occurrence probability may be prepared for each type of failure, and the first failure predictive unit 22 or the second failure predictive unit 24 may calculate the failure occurrence probability by using the predictive model corresponding to the type of failure for each type of failure.

Accordingly, the type of failure which may possibly occur in the near future is specified, and then whether or not there is the necessity for controlling the image forming apparatus or the external device is able to be determined, and thus it is possible to more accurately conduct the controlling of the apparatus.

Here, the image forming apparatus of this example is realized by a computer including a main memory device such as a Central Processing Unit (CPU) for performing various computing processes, a Random Access Memory (RAM) which is a working region of the CPU, or a Read Only Memory (ROM) in which a basic control program is recorded, an auxiliary memory device such as Hard Disk Drive (HDD) for memorizing various programs or data items, a display device for displaying various information items, and hardware resources such as an input and output I/F which is an interface with an input instrument such as an operation button or a touch panel used in an input operation by an operator, or a communication I/F which is an interface for performing wired or wireless communication with respect to other apparatuses.

Then, a program according to an exemplary embodiment of the invention is read out from the auxiliary memory apparatus or the like and installed in the RAM, and then executed by the CPU. Therefore, each function of the failure predictive apparatus according to the exemplary embodiment of the invention is realized by the computer of the image forming apparatus.

Furthermore, in the example of FIG. 1, a function of a collection unit according to the exemplary embodiment of the invention is realized by the job information collection unit 13, a function of a calculating unit according to the exemplary embodiment of the invention is realized by the second failure predictive unit 14, and a function of an output unit according to the exemplary embodiment of the invention is realized by the maintenance instruction unit 15.

In addition, in the example of FIG. 5, a function of a collection unit according to the exemplary embodiment of the invention is realized by the job information collection unit 23, a function of a calculating unit according to the exemplary embodiment of the invention is realized by the second failure predictive unit 24, and a function of an output unit is realized by the apparatus control unit 25.

Here, the program according to the exemplary embodiment of the invention is set, for example, in the computer of the image forming apparatus according to a method for reading out the program from an external storage medium such as a CD-ROM in which the program is memorized, a method for receiving the program through a communication network or the like, or the like.

Furthermore, the exemplary embodiment of the invention is not limited to an aspect in which each functional unit is realized by a software configuration as in this example, but each of the functional units may be realized by a dedicated hardware module.

In addition, in the above description, the process of calculating the failure occurrence probability is described by taking the image forming apparatus as an example, but other apparatuses for implementing the job according to a preset schedule may be a monitored apparatus, and a configuration in which the data necessary for calculating the failure occurrence probability is able to be collected from each apparatus may be used.

The exemplary embodiment of the invention is able to be used in various systems or apparatuses, and programs or methods thereof, or the like which perform the failure prediction with respect to the apparatus for implementing the job according to the preset schedule as a monitored apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A failure predictive system, comprising:
a processor;
a collection unit, operable on the processor, that collects information with respect to a job implemented in a monitored apparatus and information with respect to a scheduled job that is scheduled to be implemented in the monitored apparatus;
a calculator, operable on the processor, that calculates a probability of a failure occurrence in the monitored apparatus based on the collected information of the implemented job and the collected information of the scheduled job which are collected by the collection unit; and
an output unit, operable on the processor, that outputs information based on the calculated probability in response to the calculated probability exceeding a threshold value.

2. The failure predictive system according to claim 1, wherein the outputting information by the output unit comprises outputting a notification that is recognizable by a user.

3. The failure predictive system according to claim 1, wherein the output unit outputs control information to an apparatus which affects an implementation situation of the job in the monitored apparatus as the information based on the probability.

4. The failure predictive system according to claim 3, wherein the output unit outputs control information with respect to an air conditioner that adjusts air in a room in which the monitored apparatus is installed as the information based on the probability.

5. The failure predictive system according to claim 4, wherein the calculating unit calculates a probability of a failure with respect to an image quality, and
the output unit outputs control information which instructs the air conditioner to decrease a temperature.

6. The failure predictive system according to claim 1, wherein when a difference between a time-series variation of past information with respect to a job and a time-series variation of future information with respect to a job is equal to or larger than a predetermined value, the calculating unit calculates the failure predictor probability based on only the time-series variation of future information with respect to a job.

7. The failure predictive system according to claim 1, wherein the information with respect to a job includes at least one of the number of printed sheets, the total coverage, and the sheet characteristics.

8. The failure predictive system according to claim 1, wherein the output unit outputs control information which causes a job to be implemented in the monitored apparatus to be implemented in another monitored apparatus as the information based on the probability.

9. The failure predictive system according to claim 1, wherein the output unit outputs information with respect to maintenance of the monitored apparatus as the information based on the probability.

10. The failure predictive system according to claim 1, wherein the output unit outputs control information which widens an interval for implementing jobs as the information based on the probability.

11. The failure predictive system according to claim 1, wherein the collection unit collects information of an occurrence of switching to specified printing sheet in the monitored apparatus in a job of the future, and
the output unit outputs control information which changes a sequence for implementing a job using the specified printing sheet as the information based on the probability.

12. The failure predictive system according to claim 11, wherein the output unit outputs the control information which stops an implementation of the job using the specified printing sheet as the information based on the probability.

13. The failure predictive system according to claim 11, wherein the output unit outputs control information which sets the job using the specified printing sheet to be implemented in a later sequence as the information based on the probability.

14. The failure predictive system according to claim 1, wherein the calculating unit calculates the probability of the failure occurrence in the monitored apparatus for each type of failure by using a predictive model corresponding to the type of failure.

15. A failure predictive apparatus, comprising:
a processor;
a collection unit, operable on the processor, that collects information with respect to a job implemented in a monitored apparatus and information with respect to a scheduled job that is scheduled to be implemented;
a calculator, operable on the processor, that calculates a probability of a failure occurrence in the monitored apparatus based on the collected information of the implemented job and the collected information of the scheduled job which are collected by the collection unit; and an output unit, operable on the processor, that outputs information based on the calculated probability in response to the calculated probability exceeding a threshold value.

16. The failure predictive apparatus according to claim 15, wherein the outputting information by the output unit comprises outputting a notification that is recognizable by a user.

\* \* \* \* \*